(12) United States Patent
Fujii et al.

(10) Patent No.: US 9,737,906 B2
(45) Date of Patent: Aug. 22, 2017

(54) METHOD FOR FORMING EXCELLENT MULTI-LAYER COATING FILM

(71) Applicants: NIPPON PAINT CO., LTD., Osaka (JP); Mazda Motor Corporation, Hiroshima (JP)

(72) Inventors: Hiroaki Fujii, Hiroshima (JP); Yoshiko Aoki, Hiroshima (JP); Hiroshi Kubota, Hiroshima (JP); Masafumi Shinoda, Hiroshima (JP); Tatsuo Tsuneoka, Hiroshima (JP); Fumi Hirano, Hiroshima (JP); Sakura Nakano, Hiroshima (JP)

(73) Assignees: NIPPON PAINT AUTOMOTIVE COATINGS CO., LTD., Osaka (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/420,818

(22) PCT Filed: Apr. 18, 2013

(86) PCT No.: PCT/JP2013/061526
§ 371 (c)(1),
(2) Date: Feb. 10, 2015

(87) PCT Pub. No.: WO2014/034175
PCT Pub. Date: Mar. 6, 2014

(65) Prior Publication Data
US 2015/0217332 A1 Aug. 6, 2015

(30) Foreign Application Priority Data
Aug. 28, 2012 (JP) ................................. 2012-187709

(51) Int. Cl.
*B05D 7/00* (2006.01)
*B05D 5/06* (2006.01)
(Continued)

(52) U.S. Cl.
CPC ............... *B05D 5/066* (2013.01); *B05D 1/38* (2013.01); *B05D 3/0254* (2013.01); *B05D 5/063* (2013.01);
(Continued)

(58) Field of Classification Search
CPC ............ B05D 7/572; B05D 7/57; B05D 7/56
See application file for complete search history.

(56) References Cited

U.S. PATENT DOCUMENTS

| 4,208,488 A | 6/1980 | Kraft et al. |
| 5,407,702 A | 4/1995 | Smith et al. |

(Continued)

FOREIGN PATENT DOCUMENTS

| CN | 1128682 | 8/1996 |
| CN | 1939604 | 4/2007 |

(Continued)

OTHER PUBLICATIONS

Decision on Grant issued Jul. 13, 2015 in corresponding Russian patent application No. 2015111265/05(017545) with English translation.

(Continued)

*Primary Examiner* — Francisco Tschen
(74) *Attorney, Agent, or Firm* — Wenderoth, Lind & Ponack, L.L.P.

(57) ABSTRACT

The purpose of the present invention is to obtain a method for forming an excellent multi-layer coating film of high chroma and brightness and a rich color. With the method, color mottling does not occur easily in the coating film and the design obtained is homogeneous even without strict (Continued)

control of variations in film thickness during coating. The method for forming the excellent multi-layer coating film comprises: forming a metallic base coating film on the surface of the object to be coated by applying a metallic base coating containing a shiny material; then forming a color base coating film by applying a color base coating; subsequently forming a clear coating film by applying a clear coating on the color base coating film; and heat-curing the metallic base coating film, the color base coating film and the clear coating film obtained. In the method, the light reflectance of the metallic base coating film is in a specified range and the light transmittance of the single color base coating film obtained by heat-curing the color base coating film as a single film is adjusted to a specified range.

2 Claims, 1 Drawing Sheet

(51) Int. Cl.
    *C09D 201/00*     (2006.01)
    *C09D 5/28*     (2006.01)
    *C09D 7/00*     (2006.01)
    *B05D 1/38*     (2006.01)
    *B05D 3/02*     (2006.01)
    *B05D 7/14*     (2006.01)

(52) U.S. Cl.
    CPC ............... *B05D 5/068* (2013.01); *B05D 7/14* (2013.01); *B05D 7/57* (2013.01); *C09D 5/28* (2013.01); *C09D 7/007* (2013.01); *C09D 201/00* (2013.01)

(56) References Cited

U.S. PATENT DOCUMENTS

| | | | |
|---|---|---|---|
| 5,718,950 A | 2/1998 | Komatsu et al. | |
| 5,976,343 A * | 11/1999 | Schlaak | B05D 7/577 205/149 |
| 7,399,532 B2 | 7/2008 | Seido et al. | |
| 2004/0159555 A1* | 8/2004 | Purdy | B05D 7/16 205/198 |
| 2005/0100674 A1* | 5/2005 | Brown | B05D 7/02 427/384 |
| 2005/0214483 A1 | 9/2005 | Fujieda et al. | |
| 2007/0077437 A1 | 4/2007 | Kakii et al. | |

FOREIGN PATENT DOCUMENTS

| | | |
|---|---|---|
| EP | 0 987 062 | 3/2000 |
| JP | 6-126239 | 5/1994 |
| JP | 2000-84473 | 3/2000 |
| JP | 2000-279877 | 10/2000 |
| JP | 2001-314807 | 11/2001 |
| JP | 2002-86057 | 3/2002 |
| JP | 2002-273332 | 9/2002 |
| JP | 2005-137952 | 6/2005 |
| JP | 2005-305424 | 11/2005 |
| JP | 2007-167720 | 7/2007 |
| JP | 2008-302286 | 12/2008 |
| JP | 4727411 | 4/2011 |
| RU | 2 188 837 | 5/1997 |
| RU | 2 402 385 | 5/2006 |
| SU | 1037845 | 2/1978 |
| WO | 95/06689 | 3/1995 |
| WO | 97/44394 | 11/1997 |
| WO | 2007/022810 | 3/2007 |

OTHER PUBLICATIONS

International Search Report issued Jul. 30, 2013 in International (PCT) Application No. PCT/JP2013/061526.

Office Action with search report issued Sep. 14, 2015 in corresponding Chinese patent application No. 201380044979.6 (with English translation).

* cited by examiner

METHOD FOR FORMING EXCELLENT MULTI-LAYER COATING FILM

TECHNICAL FIELD

The present invention relates to a process for forming a multi-layer coating film, especially a process for forming an excellent multi-layer coating film.

BACKGROUND OF THE INVENTION

In recent years, an excellent multi-layer coating film with high saturation, high brightness and excellent color depth is known as an automobile body coating film, in which the excellent multi-layer coating film is formed by applying a color clear film containing a coloring pigment on a metallic base coating film containing a luster pigment. Such excellent multi-layer coating films are referred to as "candy color" coating film.

Candy color coating films are getting a lot of attention as an automobile exterior. However, making candy color coating films requires strictly control for coating conditions such as suppression of variations in film thickness so as to obtain uniform film design in whole automobile body having complex shape. Lack of control for coating conditions provides frequent color unevenness and non-uniform film design. In addition, suppression of variations in film thickness in a formation of coating film lowers production efficiency.

JP 2001-314807 A (Patent Document 1) describes a method for forming a multilayer coating film comprising a process to form a first coating film by applying a first coating composition containing a luster pigment to the surface of an object to be coated, a process to form a second coating film by applying a second coating composition which contains a coloring component whose content is 0.01-1 wt. % for the resin solid content of the coating composition to the surface of the first coating film, without baking and curing the first coating film, and a process to form a clear coating film by applying a clear coating composition to the surface of the second coating film, without baking and curing the second coating film, then the coating films are heated and cured. The method includes control of a content of the coloring pigment in the second coating film to resolve a problem in use of a color clear coating composition. The method can prevent color unevenness and color dulling of a coating film. Even if using such technologies, making a candy color coating film accompanies frequent color unevenness, difficulty of homogeneous film design and uniform coating color. In addition, suppression of variations in film thickness in a formation of coating film is required, which lowers production efficiency.

JP 2007-167720 A (Patent Document 2) describes a process for forming a multi-layer coating film comprising the steps of:

applying a metallic base coating composition on a coating substrate to form a metallic base coating film, wherein the metallic base coating composition comprises a luster pigment, applying a color base coating composition to the metallic base coating film to form a color base coating film, wherein the color base coating composition comprises a coloring pigment, applying a clear coating composition to the color base coating film to form a clear coating film, and simultaneously heating and curing the metallic base coating film, the color base coating film and the clear coating film to form a multi-layer coating film, wherein a brightness L* value of the metallic base coating film is not greater than 60 and a light transmittance in a wavelength of 400 nm to 700 nm of the color base coating film is 30 to 50%. The Patent Document 2 also describes reduction of color unevenness due to variations in film thickness of a candy color coating film. However, the process is not enough to improve production efficiency. In addition, a candy color coating film having excellent color depth is required.

PRIOR ART DOCUMENTS

Patent Documents

Patent Document 1: JP 2001-314807 A
Patent Document 2: JP 2007-167720 A

SUMMARY OF THE INVENTION

Problems to be Resolved by the Invention

A main object of the present invention is to provide a process for forming a multi-layer coating film, especially a process for forming an excellent multi-layer coating film having less color unevenness and uniform film design without severe control of variations in film thickness, as well as having high saturation, high brightness and excellent color depth. The process for forming a multi-layer coating film can provide a so-called candy color coating film.

Means of Solving the Problems

The present invention provides a process for forming an excellent multi-layer coating film comprising the steps of:

(1) applying a metallic base coating composition on a coating substrate to form a metallic base coating film, wherein the metallic base coating composition comprises a coloring pigment and a luster pigment, (2) applying a color base coating composition to the metallic base coating film obtained by the step (1) to form a color base coating film, wherein the color base coating composition comprises a coloring pigment and does not comprises a luster pigment, (3) applying a clear coating composition to the color base coating film obtained by the step (2) to form a clear coating film, and (4) simultaneously heating and curing the metallic base coating film, the color base coating film and the clear coating film formed in the steps (1), (2) and (3) to form a multi-layer coating film, wherein a single layer of the metallic base coating film obtained by heating and curing of the metallic base coating film in the step (1) has a light reflectance of from 45 to 50% in a wavelength range of 650 to 700 nm and a light reflectance of not more than 20% in wavelength ranges of 410 to 440 nm and 510 to 590 nm, and a single layer of the color base coating film obtained by heating and curing of the color base coating film in the step (2) has light transmittance of from 50 to 70% in a wavelength range of 400 to 700 nm, light transmittance of from 88 to 92% in a wavelength range of 650 to 700 nm and light transmittance of from 20 to 60% in wavelength ranges of 410 to 440 nm and 510 to 590 nm.

According to the present invention, the coloring pigment in the metallic base coating composition and the coloring pigment in the color base coating composition may preferably be the same coloring pigment.

The coloring pigment may preferably be a perylene pigment.

Advantageous Effect of the Invention

The present invention can provide an excellent multi-layer coating film having high saturation, high brightness and excellent color depth in case of presence of a little variations in film thickness under coating process, in terms of controlling a light reflectance of a single layer of the metallic base coating film and light transmittance of a single layer of the color base coating film. In the present invention, a light reflectance and light transmittance are high value in a visible region in high wavelength band, i.e., in a wavelength range of 650 to 700 nm, and are low value in other wavelength regions.

Figure 1:
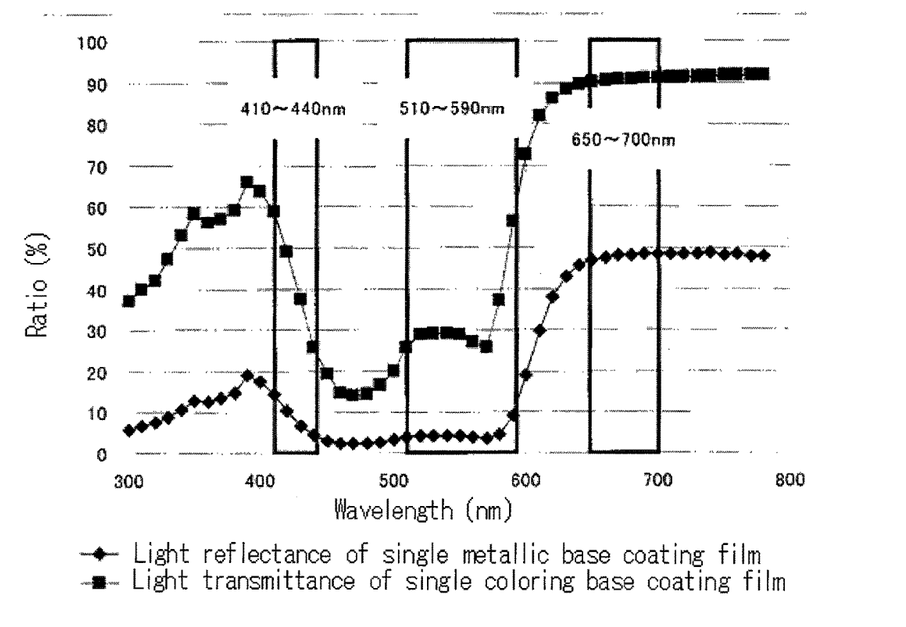
FIG. 1 is a graphic chart of light reflectance of a single metallic base coating film and light transmittance of a single color base coating film obtained by the process for forming an excellent multi-layer coating film according to the present invention, by plotting wavelength in a horizontal axis, and light reflectance of a single metallic base coating film and light transmittance of a single color base coating film in a vertical axis.

FIG. 1 shows a graphic chart by plotting light reflectance (%) and light transmittance (%) which satisfies the specification according to the present invention, indicating a horizontal axis being wavelength and a vertical axis being transmittance and reflectance (%). As shown in FIG. 1, high light reflectance of a single layer of a metallic base coating film (black squares in FIG. 1) and high light transmittance of a single layer of a color base coating film (black diamonds in FIG. 1) in a long wavelength band, i.e., in a wavelength range of 650 to 700 nm, and low light reflectance of a single layer of a metallic base coating film (black squares) and low light transmittance of a single layer of a color base coating film (black diamonds) in a short wavelength band, i.e., in a wavelength range of 410 to 590 nm, can provide an excellent multi-layer coating film having high saturation, high brightness, excellent color depth and less color unevenness. Especially, the present invention can be preferably employed in forming a multi-layer coating film having red candy color.

DETAILED DESCRIPTION OF THE PREFERRED EMBODIMENTS

The present invention relates to a process for forming an excellent multi-layer coating film comprising the steps of:

(1) applying a metallic base coating composition on a coating substrate to form a metallic base coating film, wherein the metallic base coating composition comprises a coloring pigment and a luster pigment, (2) applying a color base coating composition to the metallic base coating film obtained by the step (1) to form a color base coating film, wherein the color base coating composition comprises a coloring pigment and does not comprises a luster pigment, (3) applying a clear coating composition to the color base coating film obtained by the step (2) to form a clear coating film, and (4) simultaneously heating and curing the metallic base coating film, the color base coating film and the clear coating film formed in the steps (1), (2) and (3) to form a multi-layer coating film.

Step (1)

The step (1) in the process for forming an excellent multi-layer coating film according to the present invention is a step of applying a metallic base coating composition on a coating substrate to form a metallic base coating film, wherein the metallic base coating composition comprises a coloring pigment and a luster pigment.

The metallic base coating film can hide a surface color of a coating substrate, and can provide excellent film design having high brightness, high saturation and high translucence, by combining a color base coating film and a clear coating film described below.

Coating Substrate

A coating substrate may include, for example, metal products such as iron, steel, aluminum, tin, zinc and alloyed metal thereof, and molding products obtained by metallizing or vapor deposition thereof, as well as molding products of glass, plastics or foam. Concrete example of such coating substrate includes, for example, an automobile body or automobile components. The coating substrate may preferably be treated preprocessing such as delipidation or surface processing. The coating substrate may have undercoating film on its surface.

The undercoating film can provide hiding property of a surface of a substrate, anti-corrosion property and rust prevention property. The undercoating film can be obtained by applying an undercoating composition, then heating and curing the resulting coating film. A film thickness of the undercoating film may be, for example, from 10 to 50 µm in dry film thickness. Such an undercoating composition is not limited, and includes, for example, a cationic electrodeposition coating composition or an anionic electrodeposition coating composition, specifically, an electrodeposition coating compositions known to a person skilled in the art, such as an electrodeposition coating composition containing a resin component having hydroxyl group and a blocked polyisocyanate, and an electrodeposition coating composition containing a resin having sulfonium group and propargyl group. The undercoating film can be obtained by electrocoating of an undercoating composition, then heating and curing under a condition of the kind of the undercoating composition.

The coating substrate may further have an intermediate coating film on an undercoating film. The intermediate coating film can provide hiding property of a surface of a substrate or a surface of an undercoating film, adhesion property, and chipping-resistant property. The intermediate coating film can be obtained by applying an intermediate coating composition on an undercoating film. An film thickness of the intermediate coating film may be, for example, from 10 to 50 µm in dry film thickness. Such an intermediate coating composition for forming an intermediate coating film may include, for example, an intermediate coating composition containing a film-forming resin which is known to a person skilled in the art, such as a combination of a hydroxyl group-containing polyester resin and/or a hydroxyl-group containing acrylic resin, with a melamine resin and/or a blocked polyisocyanate. The intermediate coating composition is applied corresponding to the kind of the intermediate coating composition, then the resulting coating film is dried under a room temperature or is cured under heating. The step (1) may be performed without curing the intermediate coating film, in a so-called wet-on-wet coating method.

Metallic Base Coating Composition

The metallic base coating composition used in the process for forming a multi-layer coating film according to the present invention may preferably be a curable coating composition. The metallic base coating composition contains a film-forming resin, a coloring pigment and a luster pigment.

The film-forming resin is a binder in a resulting base coating film. The film-forming resin includes, for example, an acrylic resin, a polyester resin, an epoxy resin, an urethane resin and the like. The film-forming resin may include a resin having a curable functional group, and may further contain a curing agent such as an amino resin or an isocyanate resin having blocked isocyanate group as needed, which can react the curable functional group.

The coloring pigment can provide hiding property of a surface of a coating substrate and saturation for the resulting multi-layer coating film. The coloring pigment includes, for example, an inorganic coloring pigment such as titanium dioxide, carbon black, iron oxide, yellow iron oxide and the like; and an organic coloring pigment such as phthalocyanine blue, phthalocyanine green, carbazole violet, anthrapyridine, azo orange, flavan slon yellow, isoindolin yellow, azo yellow, indanthrene blue, dibromo anza slon red, perylene red, azo red, anthraquinone red, quinacridone red, diketopyrrolopyrrole red and the like. The coloring pigment may preferably be a perylene pigment, especially perylene red in terms of saturation and brightness.

The luster pigment can provide brightness for the resulting multi-layer coating film. The luster pigment is not limited as long as it has specific light reflectance, and includes, for example, aluminum powder, alumina powder, bronze powder, copper powder, tin powder, zinc white, iron phosphide, metal-coating mica powder, titanium dioxide-coating mica powder and the like. The luster pigment may preferably be aluminum powder in terms of obtaining specific light reflectance.

An amount of the coloring pigment is not limited and may preferably be within a range of 3 to 20 mass % as a pigment mass concentration, i.e., (a mass content of pigment(s) in a coating composition)/(sum of the mass content of pitment(s) and a solid content of film-forming components) in terms of brightness and saturation, more preferably of 7 to 17 mass % and most preferably of 10 to 15 mass %. When an amount of the coloring pigment is less than 3 mass %, suppression of light reflectance in a short wavelength band, i.e., in a wavelength range of 410 to 590 nm, may be insufficient and may not prevent occurrence of color unevenness. On the other hand, when an amount of the coloring pigment is more than 20 mass %, excellent property may not be obtained because of lack of saturation and brightness, and qualities of the multi-layer coating film may lower.

An amount of the luster pigment is not limited and may preferably be within a range of 2 to 20 mass % as a pigment mass concentration in terms of brightness and saturation, more preferably of 3 to 15 mass % and most preferably of 5 to 10 mass %. When an amount of the luster pigment is less than 2 mass %, an excellent multi-layer coating film may not be obtained because of lack of saturation and brightness. On the other hand, when an amount of the luster pigment is more than 20 mass %, qualities of the multi-layer coating film may lower.

The metallic base coating composition may optionally contain an extender pigment, a curing catalyst, a surface conditioner, an ultraviolet absorber, an antioxidant and the like, which are conventionally used in the art.

A type of the metallic base coating composition is not limited, and may be any of a solvent-based coating composition, an aqueous dispersion-type coating composition or a water soluble-type coating composition.

In the metallic base coating composition used in the process for forming an excellent multi-layer coating film according to the present invention, a light reflectance of from 45 to 50% in a wavelength range of 650 to 700 nm and light reflectance of not more than 20% in wavelength ranges of 410 to 440 nm and 510 to 590 nm in a single layer of a metallic base coating film obtained therefrom is required, especially a coating color of the multi-layer coating film is in a red color gamut. When the wavelength ranges are out of the above ranges, a coating color of the coating film is not in a red color gamut.

A light reflectance can be measured by the following method. An cationic electrodeposition coating composition is applied on a steel plate and cured, then an intermediate coating composition is applied to the plate and cured. To the resulting plate, a metallic base coating composition is applied by a spray method so as to obtain a dry coating film thickness of 10 µm, then the resulting coating film is heated and cured at a temperature of 140° C. for 20 minutes to obtain a single layer of a metallic base coating film. The term "a single layer of a metallic base coating film" in this specification means a metallic base coating film applied on a substrate having an cationic electrodeposition coating film and an intermediate coating film, and means the state without any coating films on the metallic base coating film.

A light reflectance can be obtained by a U-3310 type spectrophotometer (produced by Hitachi Ltd.), by measuring a ratio of reflected light intensity toward a single layer of a metallic base coating film against irradiation light intensity under a condition of a wavelength scan mode in a range of 300 to 780 nm, a scan speed of 300 nm/minute, a sampling interval of 0.5 nm.

A light reflectance measured by a method described above is from 45 to 50% in a wavelength range of 650 to 700 nm, preferably from 47 to 49%. The wavelength region can impact on saturation and brightness. When a light reflectance is less than 45%, brightness of the resulting multi-layer coating film lowers. When a light reflectance is more than 50%, saturation of the resulting multi-layer coating film lowers.

Furthermore, a light reflectance is not more than 20% in wavelength ranges of 410 to 440 nm and 510 to 590 nm, preferably not more than 15%, most preferably not more than 10%. In the wavelength regions, a light transmittance of a single layer of a color base coating film significantly changes in case that its coating color is red. The wavelength regions also can impact on film design of the multi-layer coating film. Therefore, lowering a light reflectance of incident light of the metallic base coating film in the wavelength regions can provide suppressed coloring, and can minimize unhomogeneous film design due to variations in film thickness. When a light reflectance in the wavelength regions is more than 20%, unhomogeneous film design due to variations in film thickness under coating enlarges and film design deteriorates.

Controlling of the light reflectance of the metallic base coating film is performed by selecting the kind of the coloring pigment and the luster pigment, pigment mass concentration thereof and a film thickness of a resulting coating film. Specifically, in case of using a metallic base coating composition in which the coloring pigment is perylene red, the luster pigment is aluminum powder, a pigment mass concentration of the coloring pigment is 10 to 15 mass % and a pigment mass concentration of aluminum powder is 5 to 10 mass %, a multi-layer coating film having less color unevenness, uniform film design, high saturation, high brightness and excellent color depth can be obtained by applying the metallic base coating composition to obtain a dry film thickness of 7 to 12 µm.

A solid content and a viscosity of the metallic base coating composition can be controlled by diluting it with an organic solvent and/or water. A concrete example of a coating method of the metallic coating composition in the step (1) can include an air spray coating, an airless spray coating, an electrostatic spray coating and the like. In the above coating method, an electrostatic spray coating may be preferred in view of coating efficiency.

Furthermore, setting a time interval between the step (1) and the step (2) may be preferred in view of preventing flooding and bleeding at interlayer portion of the metallic base coating film obtained by the step (1) and the color coating film obtained by the step (2). The time interval can provide sufficient volatilization of an organic solvent and/or water, to improve film design of the resulting multi-layer coating film. The time interval may be, for example, in a range of 15 seconds to 15 minutes. Furthermore, a heating operation toward a coating substrate having the metallic base coating film may be performed in the time interval. As for the heat operation, so-called preheat operation may be preferred in view of energy-saving. The preheat is a heating operation with short-time heating for efficient volatilization of an organic solvent and/or water containing the metallic base coating film, rather than curing of the metallic base coating film. On the other hand, the heat operation may be a heat operation which provides curing of the metallic base coating film. The preheat may be a heat operation in a temperature of 40 to 80° C. for 2 to 10 minutes. The preheat can be performed with use of a fan heater or an infrared heater.

Step (2)

The step (2) in the process for forming an excellent multi-layer coating film according to the present invention is a step of applying a color base coating composition to the metallic base coating film obtained by the step (1) to form a color base coating film, in which the color base coating composition contains a coloring pigment and does not contain a luster pigment. The color base coating film can provide fine color adjustment of the metallic base coating film, to increase saturation and color depth.

Color Base Coating Composition

The color base coating composition used in the process for forming a multi-layer coating film according to the present invention may preferably be a curable coating composition. The color base coating composition contains a film-forming resin and a coloring pigment. On the other hand, the color base coating composition does not contain a luster pigment. If the color base coating composition contains a luster pigment, a resulting color base coating film weakens a light reflection of the underlying metallic base coating film, to obtain inferior color depth.

As for a film-forming resin and a coloring pigment contained in the color base coating composition, the above film-forming resin and the coloring pigment of the metallic base coating composition may be used. Hue of the color base coating film and hue of the metallic base coating film may preferably be a similar color, more preferably be a same color. The term "a similar color" in the present invention means that two colors belongs the same or adjacent color placement of hue circle of the Munsell color system. In the present invention, a perylene pigment may be preferred as the coloring pigment contained in the metallic base coating composition. Thus a perylene pigment, especially perylene red, may be preferred as the coloring pigment contained in the color base coating composition.

An amount of the coloring pigment may preferably be within a range of 0.1 to 5 mass % as a pigment mass concentration, more preferably within a range of 0.5 to 3 mass %, most preferably within a range of 1 to 2 mass %. When an amount of the coloring pigment is less than 0.1 mass %, improvement of saturation of a multi-layer coating film may not be obtained. On the other hand, when an amount of the coloring pigment is more than 5 mass %, translucence of a multi-layer coating film may be deteriorated.

The color base coating composition may optionally contain an extender pigment, a curing catalyst, a surface conditioner, an ultraviolet absorber, an antioxidant and the like, which is conventionally used in the art.

A type of the color base coating composition is not limited, and may be any of a solvent-based coating composition, an aqueous dispersion-type coating composition or a water soluble-type coating composition.

In the color base coating composition used in the process for forming an excellent multi-layer coating film according to the present invention, a light transmittance of from 50 to 70% in a wavelength range of 400 to 700 nm, light transmittance of from 88 to 92% in a wavelength range of 650 to 700 nm and light transmittance of from 20 to 60% in wavelength ranges of 410 to 440 nm and 510 to 590 nm in a single layer of a color base coating film obtained therefrom is required, especially a coating color of the multi-layer coating film is in a red color gamut. When the wavelength ranges are out of the above ranges, a coating color of the coating film is not in a red color gamut.

A light transmittance can be measured by the following method. A color base coating composition is applied on a polypropylene plate by a spray method so as to obtain a dry coating film thickness of 12 µm, then is heated and cured at a temperature of 140° C. for 20 minutes, and the resulting coating film is peeled away to obtain a single layer of a color base coating film. The term "a single layer of a color base coating film" in this specification means a color base coating film applied on a substrate and is peeled away.

A light transmittance can be obtained by a U-3310 type spectrophotometer (produced by Hitachi Ltd.), by measuring a ratio of transmitted light intensity of incident light through a single layer of a color base coating film under a condition of a wavelength scan mode in a range of 300 to 780 nm, a scan speed of 300 nm/minute, a sampling interval of 0.5 nm.

A light transmittance measured by a method described above is from 50 to 70% in a wavelength range of 400 to 700 nm, preferably from 50 to 60%, more preferably from 50 to 55%. The wavelength region can impact on saturation and brightness. When a light transmittance is less than 50%, brightness of the resulting multi-layer coating film lowers. When a light transmittance is more than 70%, saturation of the resulting multi-layer coating film lowers. Furthermore, a light transmittance is from 88 to 92%, more preferably from 89 to 91% in wavelength ranges of 650 to 700 nm. The wavelength region can impact on saturation and brightness. When a light transmittance is less than 88%, brightness of the resulting multi-layer coating film lowers. When a light transmittance is more than 92%, saturation of the resulting multi-layer coating film lowers.

Furthermore, a light transmittance is from 20 to 60% in wavelength ranges of 410 to 440 nm and 510 to 590 nm, preferably from 20 to 50%, more preferably from 20 to 40%. In the wavelength regions, a light transmittance of a single layer of a color base coating film significantly changes in case that its coating color is red. The wavelength regions also can impact on film design of the multi-layer coating film. Therefore, controlling the light transmittance of the color base coating film in the wavelength regions can provide suppressed color change due to variations in film thickness. When the light transmittance in the wavelength regions is less than 20%, saturation lowers. When the light transmittance in the wavelength regions is more than 60%, unhomogeneous film design due to variations in film thickness under coating enlarges and film design deteriorates.

Controlling of the light transmittance of the color base coating film is performed by selecting the kind of the coloring pigment, pigment mass concentration thereof and a film thickness of a resulting coating film. Specifically, using a color base coating composition in which the coloring pigment is perylene red and a pigment mass concentration of the coloring pigment is 1 to 2 mass %, a multi-layer coating film having less color unevenness, uniform film design, high saturation, high brightness and excellent color depth can be obtained by applying the color base coating composition to obtain a dry film thickness of 10 to 15 µm.

A solid content and a viscosity of the color base coating composition can be controlled by diluting it with an organic solvent and/or water.

Furthermore, setting a time interval between the step (2) and the step (3) may be preferred in view of preventing flooding and bleeding at interlayer portion of the color base coating film obtained by the step (2) and the clear coating film obtained by the step (3). The time interval may be, for example, left in a several minutes, optionally with a heating operation toward a coating substrate having the color base coating film in the same manner of the time interval after the step (1). The time interval and heating operation can be performed in the same manner of the time interval after the step (1).

Step (3)

The step (3) in the process for forming an excellent multi-layer coating film according to the present invention is a step of applying a clear coating composition to the color base coating film obtained by the step (2) to form a clear coating film. The clear coating film can prevent color-dulling of the metallic base coating film and color base coating film, furthermore, can provide excellent translucence and color depth of a multi-layer coating film.

Clear Coating Composition

The clear coating composition used in the process for forming a multi-layer coating film according to the present invention may preferably be a curable coating composition. The clear coating composition contains a film-forming resin. As for a film-forming resin in the clear coating composition, the resin and the curing agent of the metallic base coating composition may be used. On the other hand, a combination of an acrylic resin and/or an polyester resin having functional group containing active hydrogen, such as hydroxyl group, with a curing agent of polyisocyanate resin optionally blocked, or a combination of an acrylic rein and/or an polyester resin containing carboxylic acid group with an acrylic resin containing epoxy group may be preferred in view of acid-resistant property.

Furthermore, the clear coating composition may optionally contain a surface conditioner, a viscous-controlling agent, an ultraviolet absorber, a light stabilizer and the like, which is conventionally used in the art.

The clear coating composition may preferably contain neither coloring pigments nor luster pigments in view of prevention of color-dulling, weatherability and color depth of the resulting coating film.

A type of the clear coating composition is not limited, and may be any of a solvent-based coating composition, an aqueous dispersion-type coating composition, a water soluble-type coating composition or a powdered coating composition.

A solid content and a viscosity of the clear coating composition can be controlled by diluting it with an organic solvent and/or water, in case that the clear coating composition used in the step (3) is a solvent-based coating composition, an aqueous dispersion-type coating composition or a water soluble-type coating composition.

A coating method of the step (3) is not limited and may be selected depending on a type and a form of the clear coating composition. In case that the coating composition is a solvent-based coating composition, an aqueous dispersion-type coating composition or a water soluble-type coating composition, the coating method may be an air spray coating, an airless spray coating, an electrostatic spray coating and the like. In case that the coating composition is a powdered coating composition, the coating method may be a powder coating process. A film thickness of the clear coating film is not limited and may be, for example, from 30 to 50 µm in dry film thickness.

Step (4)

The step (4) in the process for forming an excellent multi-layer coating film according to the present invention is a step of heating and curing the metallic base coating film, the color base coating film and the clear coating film formed in the steps (1), (2) and (3) to form a multi-layer coating film.

A condition of heating and curing is not limited. For example, the coating film may be heated and cured in an appropriate temperature and time to obtain an excellent multi-layer coating film on a coating substrate. The above temperature and time can be selected depending on a kind of the clear coating composition.

The resultant excellent multi-layer coating film has excellent translucence and color depth and high saturation. In addition, the excellent multi-layer coating film has less color unevenness and uniform film design without severe control of variations in film thickness. A film thickness of the excellent multi-layer coating film is not limited and may be, for example, from 30 to 100 µm in dry film thickness.

The present invention is more concretely illustrated below according to Examples, but the present invention is not limited only to these Examples.

Preparation Example 1

Preparation of Metallic Coating Composition 1

In a stainless container, 87.8 parts by mass of an acrylic resin (produced by Nippon Paint Co., Ltd., an acid value of 20 mgKOH/g, a hydroxyl value of 75 mgKOH/g, a number average molecular weight of 5000, a solid content of 60%) was added, then 12.0 parts of Paliogen Maroon L3920 (trade name, perylene red produced by BASF corporation) was added and was dispersed until a particle size was less than 5 µm. Next, 47.2 parts of Uban 128 (trade name, butylated melamine resin produced by Mitsui Chemicals Inc., a solid content of 60%) and 7.0 parts of Alumipaste 7640 NS (trade name, aluminum pigment produced by Toyo aluminum K.K.) were added and mixed with a desk stirrer to obtain a metallic base coating composition 1. A viscosity of the resulting coating composition was controlled before coating.

A light reflectance of the metallic coating composition 1 was measured by the following method. The result is shown in Table 1.

Measuring Method of Light Reflectance

To a dull stainless plate which had been subjected to zinc phosphate chemical treatment, electrocoating was applied to obtain a dry film thickness of 20 μm in use of "POWERNIX 110" (a cationic electrodeposition coating composition produced by Nippon Paint Co., Ltd.), then the resulting film was heated and cured at a temperature of 160° C. for 30 minutes to obtain a electrocoating film. To the resulting electrocoating film, Orga TO-H-880-3 Gray (an intermediate coating composition (polyester/melamine type) produced by Nippon Paint Co., Ltd.) was applied by a spray coating to obtain a dry film thickness of 30 μm, then the resulting coating film was heated and cured at a temperature of 140° C. for 20 minutes to obtain an intermediate coating film. L* value of the resulting intermediate coating film was 48, in which L* value was measured with a spectroscopic color-difference meter (SE-6000 produced by Nippon Denshoku Industries Co., Ltd.). On the resultant coated plate, the metallic base coating composition 1 was applied by a spray coating to obtain a dry film thickness of 10 μm, then the resulting coating film was heated and cured at a temperature of 140° C. for 20 minutes in a hot wind drying oven to obtain a single metallic coating film. A light reflectance of the single metallic coating film was measured using a U-3310 type spectrophotometer (produced by Hitachi Ltd.), by measuring a ratio of reflected light intensity toward a single layer of a metallic base coating film against irradiation light intensity under a condition of a wavelength scan mode in a range of 300 to 780 nm, a scan speed of 300 nm/minute, a sampling interval of 0.5 nm.

Preparation Examples 2 to 5

Preparation of Metallic Base Coating Compositions 2 to 5

Metallic base coating compositions 2 to 5 were prepared in the same manner as Preparation example 1 except that the components and amounts shown in Table 1 were used. Next, light reflectance of the metallic base coating compositions 2 to 5 was measured in the same manner in preparation example 1. The results are shown in Table 1.

Preparation Example 6

Preparation of Color Base Coating Composition 1

In a stainless container, 213.4 parts by mass of an acrylic resin (produced by Nippon Paint Co., Ltd., an acid value of 20 mgKOH/g, a hydroxyl value of 75 mgKOH/g, a number average molecular weight of 5000, a solid content of 60%) was added, then 3.0 parts of Paliogen Maroon L3920 (trade name, Perylene red produced by BASF corporation) was added and was dispersed until a particle size was less than 5 μm. Next, 114.9 parts of Uban 128 (trade name, butylated melamine resin produced by Mitsui Chemicals Inc., a solid content of 60%) was added and mixed with a desk stirrer to obtain a color base coating composition 1. A viscosity of the resulting coating composition was controlled before coating.

A light transmittance of the color base coating composition 1 was measured by the following method. The result is shown in Table 1.

Measuring Method of Light Transmittance

The color base coating composition 1 was applied to a polypropylene plate by a spray method so as to obtain a dry coating film thickness of 12 μm, then was heated and cured at a temperature of 140° C. for 20 minutes, and the resulting coating film was peeled away to obtain a single layer of a color base coating film. A light transmittance was obtained with a use of U-3310 type spectrophotometer (produced by Hitachi Ltd.), by measuring a ratio of transmitted light intensity of incident light through a single layer of a color base coating film under a condition of a wavelength scan mode in a range of 300 to 780 nm, a scan speed of 300 nm/minute, a sampling interval of 0.5 nm.

Preparation Examples 7 and 8

Preparation of Color Base Coating Compositions 2 and 3

Color base coating compositions 2 and 3 were prepared in the same manner as Preparation example 6 except that the components and amounts shown in Table 1 were used. Next, light transmittance of the color base coating compositions 2 and 3 was measured in the same manner in preparation example 6. The results are shown in Table 1.

TABLE 1

| | | Preparation Example | | | | | | | |
|---|---|---|---|---|---|---|---|---|---|
| | | 1 | 2 | 3 | 4 | 5 | 6 | 7 | 8 |
| | | Coating composition No. | | | | | | | |
| | | Metallic base coating composition | | | | | Color base coating composition | | |
| | | 1 | 2 | 3 | 4 | 5 | 1 | 2 | 3 |
| Components | Acrylic resin | 87.8 | 89.9 | 87.8 | 98.7 | 70.4 | 213.4 | 195.0 | 216.6 |
| | Paliogen Maroon L3920 | 12.0 | 7.0 | 0.0 | 2.0 | 25.0 | 3.0 | 20.0 | 0.1 |
| | Uban 128 | 47.2 | 48.4 | 47.2 | 53.0 | 37.9 | 114.9 | 105.0 | 116.6 |
| | Alumipaste 7640 NS | 7.0 | 10.0 | 7.0 | 7.0 | 10.0 | — | — | — |
| light reflectance (%) | 650-700 nm | 48 | 50 | 55 | 52 | 42 | — | — | — |
| | 410-440 nm | 9 | 18 | 56 | 35 | 5 | — | — | — |
| | 510-590 nm | 5 | 10 | 57 | 24 | 3 | — | — | — |
| light transmittance (%) | 400-700 nm | — | — | — | — | — | 55 | 30 | 80 |
| | 650-700 nm | — | — | — | — | — | 90 | 85 | 93 |
| | 410-440 nm | — | — | — | — | — | 43 | 15 | 70 |
| | 510-590 nm | — | — | — | — | — | 30 | 10 | 50 |

Preparation of Clear Coating Composition

Mack flow O-1800 clear (trade name, acid-epoxy curing type clear coating composition, produced by Nippon Paint Co., Ltd.) was used. A viscosity of the clear coating composition was controlled before coating.

Preparation Example 9

Preparation of Coating Substrate

To a dull stainless plate which had been subjected to zinc phosphate chemical treatment, electrocoating was applied to obtain a dry film thickness of 20 μm in use of "POWERNIX 110" (a cationic electrodeposition coating composition produced by Nippon Paint Co., Ltd.), and heated and cured at a temperature of 160° C. for 30 minutes to obtain an electrocoating film. To the resulting electrocoating film, Orga TO-H-880-3 Gray (an intermediate coating composition (polyester/melamine type) produced by Nippon Paint Co., Ltd.) was applied by a spray coating to obtain a dry film thickness of 30 μm, then the resulting coating film was heated and cured at a temperature of 140° C. for 20 minutes to obtain a coating substrate applied an intermediate coating film.

Example 1

To the coating substrate having the intermediate coating film obtained by Preparation example 9, the metallic coating composition 1 obtained by Preparation example 2 was applied by use of a meta bell so as to obtain a dry film thickness of 10 μm. After a time interval of 2 minutes, the color base coating composition 1 was applied thereto by use of a meta bell so as to obtain a dry film thickness of 12 μm. After a time interval of 4 minutes, the clear coating composition was applied thereto by use of micro micro bell (μμ bell) so as to obtain a dry film thickness of 35 μm. After a time interval of 10 minutes, the resulting coating films were heated and cured at a temperature of 140° C. for 20 minutes to obtain an excellent multi-layer coating film.

Saturation, color depth, brightness and color unevenness of the resulting excellent multi-layer coating films were evaluated by the following method. The results are shown in Table 2. In the Table 2, a light reflectance of the metallic coating composition in a specific wavelength and a light transmittance of the color base coating composition in a specific wavelength are also shown.

Saturation and Color Depth

Saturation and color depth of the resulting excellent multi-layer coating films were evaluated by visual observation. The evaluation standard is as follows.

○: Having excellent saturation and excellent color depth x: Having inferior saturation or no color depth Brightness 15° L* value of the resulting excellent multi-layer coating films was measured with a spectrophotometric colorimetry meter (MA-68II produced by X-Rite corporation), and brightness was evaluated on the basis of the 15° L* value. The evaluation standard is as follows.

○: 15° L* value being not less than 45 x: 15° L* value being less than 45

Color Unevenness

Color unevenness of the resulting excellent multi-layer coating films was evaluated by visual observation. The evaluation standard is as follows.

○: Having uniform color and no significant color unevenness x: Having significant color unevenness Example 2 and Comparative Examples 1 to 5

To the coating substrate having the intermediate coating film obtained by Preparation example 9, the metallic base coating composition and the color base coating composition shown in Table 2 and the clear coating composition were applied and cured in the same manner as Example 1, to obtain an excellent multi-layer coating film. Saturation and color depth, brightness and color unevenness of the resulting multi-layer coating films were evaluated in the same manner as Example 1. The results are shown in Table 2.

TABLE 2

|  |  |  |  | Example | | Comparative example | | | | |
|---|---|---|---|---|---|---|---|---|---|---|
|  |  |  |  | 1 | 2 | 1 | 2 | 3 | 4 | 5 |
| Metallic base coating composition | | | | 1 | 2 | 3 | 4 | 5 | 1 | 1 |
| Color base coating composition | | | | 1 | 1 | 1 | 1 | 1 | 2 | 3 |
| Coating film | Wavelength | | definition(%) | | | | | | | |
| Metallic base coating composition | light reflectance | 650-700 nm | 45-50 | 48 | 50 | 55 | 52 | 42 | 48 | 48 |
| | | 410-440 nm | <20 | 9 | 18 | 56 | 35 | 5 | 9 | 9 |
| | | 510-590 nm | <20 | 5 | 10 | 57 | 24 | 3 | 5 | 5 |
| Color base coating composition | light transmittance | 400-700 nm | 50-70 | 55 | 55 | 55 | 55 | 55 | 30 | 80 |
| | | 650-700 nm | 88-92 | 90 | 90 | 90 | 90 | 90 | 85 | 93 |
| | | 410-440 nm | 20-60 | 43 | 43 | 43 | 43 | 43 | 15 | 70 |
| | | 510-590 nm | 20-60 | 30 | 30 | 30 | 30 | 30 | 10 | 50 |
| Evaluation | Saturation and color depth | | | ○ | ○ | ○ | ○ | x | x | x |
| | Color unevenness | | | ○ | ○ | x | x | ○ | ○ | ○ |
| | Brightness | | | ○ | ○ | ○ | ○ | x | x | ○ |

In Examples 1 and 2, light reflectance of the metallic base coating film and light transmittance of the color base coating film were within the range of the present invention. And the multi-layer coating film had excellent saturation, color depth and brightness, without defection of color unevenness.

In Comparative examples 1 and 2, Metallic base coating composition 3 or 4 was used, which had light reflectance of the metallic base coating film out of the range of the present invention. The excellent multi-layer coating film had color unevenness.

In Comparative example 3, Metallic base coating composition 5 was used, in which light reflectance of the metallic base coating film in a wavelength range of 650 to 700 nm was 42%, i.e., lower than the range of the present invention. In Comparative example 3, the other parameters were within the range of the present invention. However, the multi-layer coating film had inferior saturation, color depth and brightness.

In Comparative examples 4 and 5, Color base coating compositions 2 or 3 was used, which had light transmittance of the color base coating film out of the range of the present invention. In Comparative examples 4 and 5, light reflectance of the metallic base coating film was within the range of the present invention. However, the multi-layer coating film had inferior saturation and color depth. The multi-layer coating film in Comparative example 4 had inferior brightness.

INDUSTRIAL APPLICABILITY

The process for forming an excellent multi-color coating film according to the present invention provides a coating process of so-called candy color coating film on a coating substrate having large coated area, especially automobile, without color unevenness. The process according to the present invention can provide a candy color coating film on various coating substrates.

What is claimed is:

1. A process for forming a multi-layer coating film comprising the steps of:
   (1) applying a metallic base coating composition to a coating substrate to form a metallic base coating film, wherein the metallic base coating composition comprises a coloring pigment and a luster pigment,
   wherein the coloring pigment in the metallic base coating composition is a perylene pigment, and the perylene pigment is a perylene red pigment, and
   wherein the coloring pigment is present in the metallic base coating composition in a range of 3 to 20 mass % as a pigment mass concentration,
   (2) applying a color base coating composition to the metallic base coating film obtained by the step (1) to form a color base coating film, wherein the color base coating composition comprises a coloring pigment and does not comprises a luster pigment,
   wherein the coloring pigment in the color base coating composition is a perylene pigment, and the perylene pigment is a perylene red pigment, and
   wherein the coloring pigment is present in the color base coating composition in a range of 0.1 to 5 mass % as a pigment mass concentration,
   (3) applying a clear coating composition to the color base coating film obtained by the step (2) to form a clear coating film, and
   (4) simultaneously heating and curing the metallic base coating film, the color base coating film and the clear coating film formed in the steps (1), (2) and (3), respectively, to form a multi-layer coating film, wherein
   a single layer of the metallic base coating film obtained by heating and curing of the metallic base coating film of step (1) has light reflectance of from 45 to 50% in a wavelength range of 650 to 700 nm and light reflectance of not more than 20% in wavelength ranges of 410 to 440 nm and 510 to 590 nm, and
   a single layer of the color base coating film obtained by heating and curing of the color base coating film of step (2) has light transmittance of from 50 to 70% in a wavelength range of 400 to 700 nm, light transmittance of from 88 to 92% in a wavelength range of 650 to 700 nm and light transmittance of from 20 to 60% in wavelength ranges of 410 to 440 nm and 510 to 590 nm.

2. A process for forming a multi-layer coating film according to claim 1, wherein the coloring pigment in the metallic base coating composition and the coloring pigment in the color base coating composition are the same coloring pigment.

* * * * *